United States Patent
Daoud

(10) Patent No.: US 6,370,246 B1
(45) Date of Patent: *Apr. 9, 2002

(54) TROUGH FOR CABLES AND WIRES

(75) Inventor: Bassel Hage Daoud, Parsippany, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/143,202

(22) Filed: Aug. 28, 1998

(51) Int. Cl.[7] .............................. F16L 3/22; H04M 1/00
(52) U.S. Cl. ...................................... 379/438; 248/68.1
(58) Field of Search .................. 379/438, 428; 248/68.1

(56) References Cited

U.S. PATENT DOCUMENTS 4,700,913 A * 10/1987 Hirano et al. .................. 248/73
5,797,566 A * 8/1998 Sato ............................. 248/49
5,996,944 A * 8/1998 Daoud .......................... 248/68.1

FOREIGN PATENT DOCUMENTS

JP          07231538     * 8/1995 ............ H02G/3/26

* cited by examiner

Primary Examiner—Jack Chiang
Assistant Examiner—Hector Agdeppa
(74) Attorney, Agent, or Firm—Howard C. Miskin; Gloria Tsui-Yip

(57) ABSTRACT

A trough for separately retaining different types of cables and/or wires yet maintaining related ones in the same area to facilitate identification and handling of the cables and/or wires. The trough comprises of a base and a pair of arms extending therefrom, enclosing a space for retaining a first type of cables and/or wires. Extending from the base into the space created by the arms is a retainer hook, dividing space into a sub-space for retaining a second type of cables and/or wires. One of the arms is pivotable from a closed to an open position to allow quick access to cables and/or wires in the space and sub-space.

7 Claims, 4 Drawing Sheets

TROUGH FOR CABLES AND WIRES

CROSS REFERENCE TO RELATED APPLICATION

This application is related to U.S. Patent Application having Ser. No. 09/143,205, now U.S. Pat. No. 5,996,944 and also identified by Docket Number Daoud 134 and is assigned to the same assignee as the present invention.

FIELD OF THE INVENTION

The invention relates to a device for securing and retaining cables and wires in bundles, which facilitates their identification and handling by separating different types of cables and/or wires into different areas yet maintaining them in the same vicinity.

BACKGROUND OF THE INVENTION

Different types of cables and wires enter and exit a junction box; for example, telephone cables, fiber optics and wires or cables for transmission of voice data and facsimile. In a complex telephone network, the number of cables and wires can be numerous and may result in a complex maze of cables and wires intertwined together in the area surrounding a junction box. Adding to the maze of a telephone network are other cables and wires that generally exist near a telephone junction box in the basement of a building, such as electrical cables, cables for television, etc. Hence, there is a need to bundle and separately retain each type of cables and wires that enter and exit a junction box, and those adjacent to the junction box, by allocating each type of cables and wires to a specific area where their identification and handling is simplified. Furthermore, separating different types of cables and wires into different areas minimizes the confusion, and possible servicing a wrong type of cables or wires.

A prior art device provides for the separation of wires by utilizing troughs for retaining the same type of wires together. The prior art trough has two arms extending from a base, with the tips of each arm almost touching each other, enclosing a space between the arms with a gap between the tips of the arms. The prior art trough is designed for inserting wires through the gap into the space between the arms. The gap is designed to only fit wires through. Hence, the prior art trough can secure and retain wires only. For use with a telephone network, the prior art trough is designed to be snap mounted onto the surface of a telephone junction box, adjacent to the exit and entry slots of the junction box, to properly secure and retain wires exiting and entering the junction box.

Although the prior art trough provides separation of different types of wires, it is sometimes desirable and helpful to collocate related types of cables and wires together in close vicinity, yet separately retained and bundled, to facilitate identification and handling. Furthermore, as the need to access cables are less frequent than wires, it is desirable to allocate cables in a separate area. For example, keeping telephone wires and telephone cables in the same vicinity while separating them from each other and from cables for television or electric cables.

Therefore, there is a need for an invention that retains cables, separates related cables and wires from each other and from other cables and wires yet keeps related cables and wires in the same vicinity.

SUMMARY OF THE INVENTION

The invention provides a device for securing and retaining different types of cables and wires separately, yet keeping related cables and wires in the same vicinity.

The invention provides a trough for separately retaining related cables and wires to facilitate their identification and handling.

The trough of the present invention comprises of a base having two arms extending therefrom. The two arms enclose a space therebetween for retaining a first type of cables or wires. Within the space of the two arms is a retainer hook for separately securing a second type of cables or wires. One of the arms is pivotable from an open to closed position, to allow the insertion of large sized or a large number of cables or wires into the space. The tips of the two arms overlap each other in a spaced, offset position, creating a gap between the tips of the two arms where wires may be slid into the space without the need to open the pivotable arm.

DETAILED DESCRIPTION OF THE PREFERRED EMBODIMENTS

Figure 1:
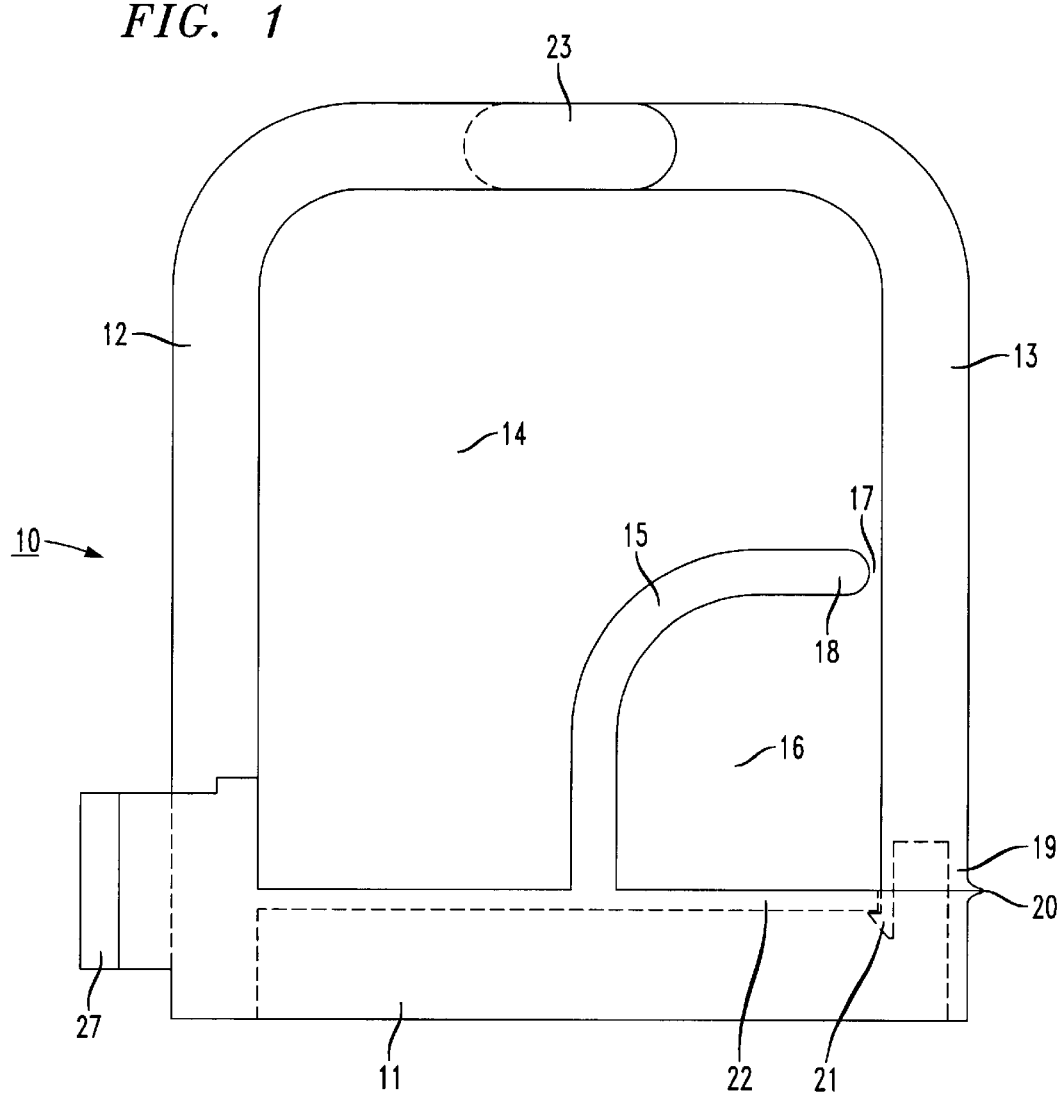
FIG. 1 is a top plan view of the present invention.

With reference to the drawings, wherein the same reference number indicates the same element throughout, there is shown in FIG. 1 a top plan view of the present invention.

The present invention, trough 10, as shown in FIG. 1, comprises a base 11 and two arms 12 and 13 extending therefrom. Arm 13 is pivotable from a closed to an open position, best shown in FIG. 4. Arms 12 and 13 are shown to be L-shaped, but other shapes, curved or straight (not shown), is contemplated and does not detract from the spirit of the present invention.

Enclosed therebetween arms 12 and 13 is space 14 for securing and retaining a first type of wires or cables. Space 14 is divided by a retainer hook 15, also extending from base 11, to enclose a sub-space 16 for securing and retaining a second type of wires or cables.

As shown in FIG. 1, sub-space 16 embodies a small portion of space 14. Depending on the specific application of trough 10, retainer hook 15 may enclose a larger or smaller sub-space 16 than that shown in FIG. 1. Retainer hook 15 extends from base 11 towards pivotable arm 13, leaving a gap 17 between the tip 18 of retainer hook 15 and arm 13. Gap 17 allows the separation and retention of wires and/or cables by sliding them into sub-space 16 from space 14.

Figure 4:
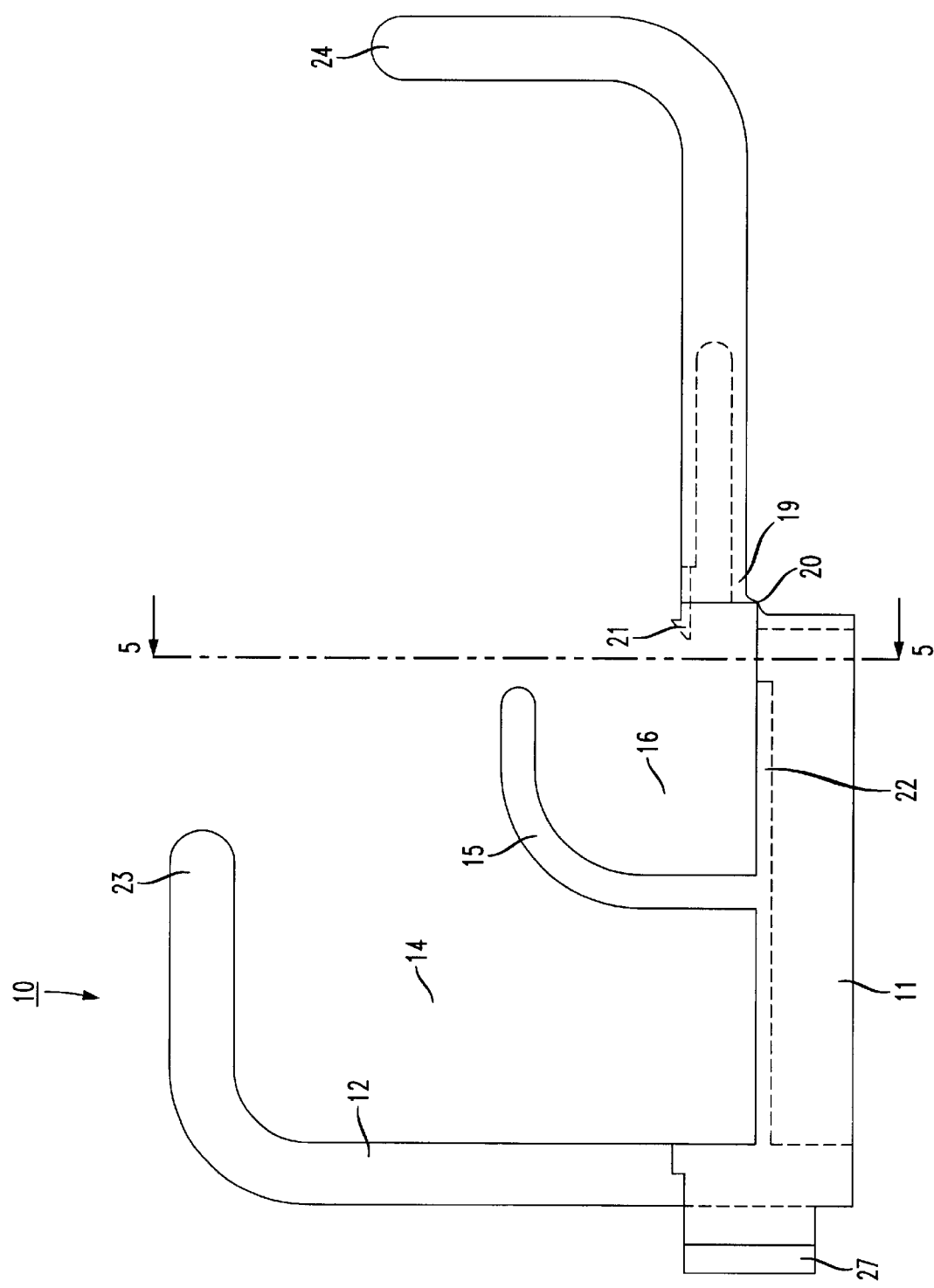
FIG. 4 is a top plan view illustrating the pivotable arm in an open position.

Arm 13 is pivotable at the bottom portion 19 to an open position to provide quick access and facilitate insertion of large cables or a large number of cables or wires into space 14 and sub-space 16, best shown in FIG. 4. Pivot point 20 is shown in FIG. 1 as a living hinge, but other pivotable means known to one skilled in the art may be substituted.

Extending from the bottom portion 19 of pivotable arm 13 is a latch 21, for positively maintaining pivotable arm 13 in a closed position. Latch 21 engages a ledge 22 in base 11 to form a latch-hook mechanism. Release of the latch-hook mechanism is accomplished by flexing latch 21 away from ledge 22 to provide clearance for the opening of pivotable arm 13. Other methods of positive engagement of pivotable arm 13 to base 11 known to one skilled in the art may be substituted, for example, a dimple-retention system.

Figure 2:
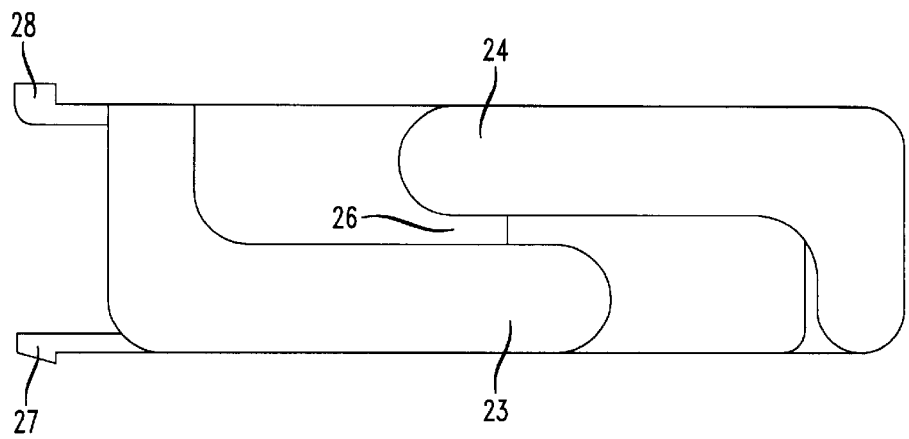
FIG. 2 is a front view illustrating the offset arms.

FIG. 2 shows arms 12 and 13 extending from base 11 in an offset position. Tips 23 and 24 of arms 12 and 13, respectively, overlap each other, forming a gap 26 therebetween. Wires may be slid into space 14, for separation and retention, without the necessity to pivot arm 13 to an open position. The offset and overlapping position of arms 12 and 13 prevents accidental slippage of wires from space 14. While the overlapping tips 23 and 24 are shown in a plane parallel to base 11, i.e. both tips 23 and 24 are equidistance from base 11, the overlapping tips 23 and 24 could also be in a plane that include base 11, i.e. tip 23 is closer to base 11 than tip 24 (not shown).

Trough 10, as shown in FIGS. 1 and 2, is adapted for use with a telephone junction box. As shown in FIG. 1, extending from base 11 is a latch 27 and a hook 28 for hooking and snap mounting trough 10 onto mating units on the surface of a junction box (not shown). Placing trough 10 at a location adjacent to the junction box facilitates the allocation of different types of wires and/or cables entering and exiting a junction box. Trough 10 can also be adapted for mounting along a wall by providing at least one hole (not shown) on arm 12 through which screws or nails may be driven to secure trough 10. Similarly, other mounting methods known to one skilled in the art may be used to secure trough 10 to a location where its use is contemplated.

Figure 3:
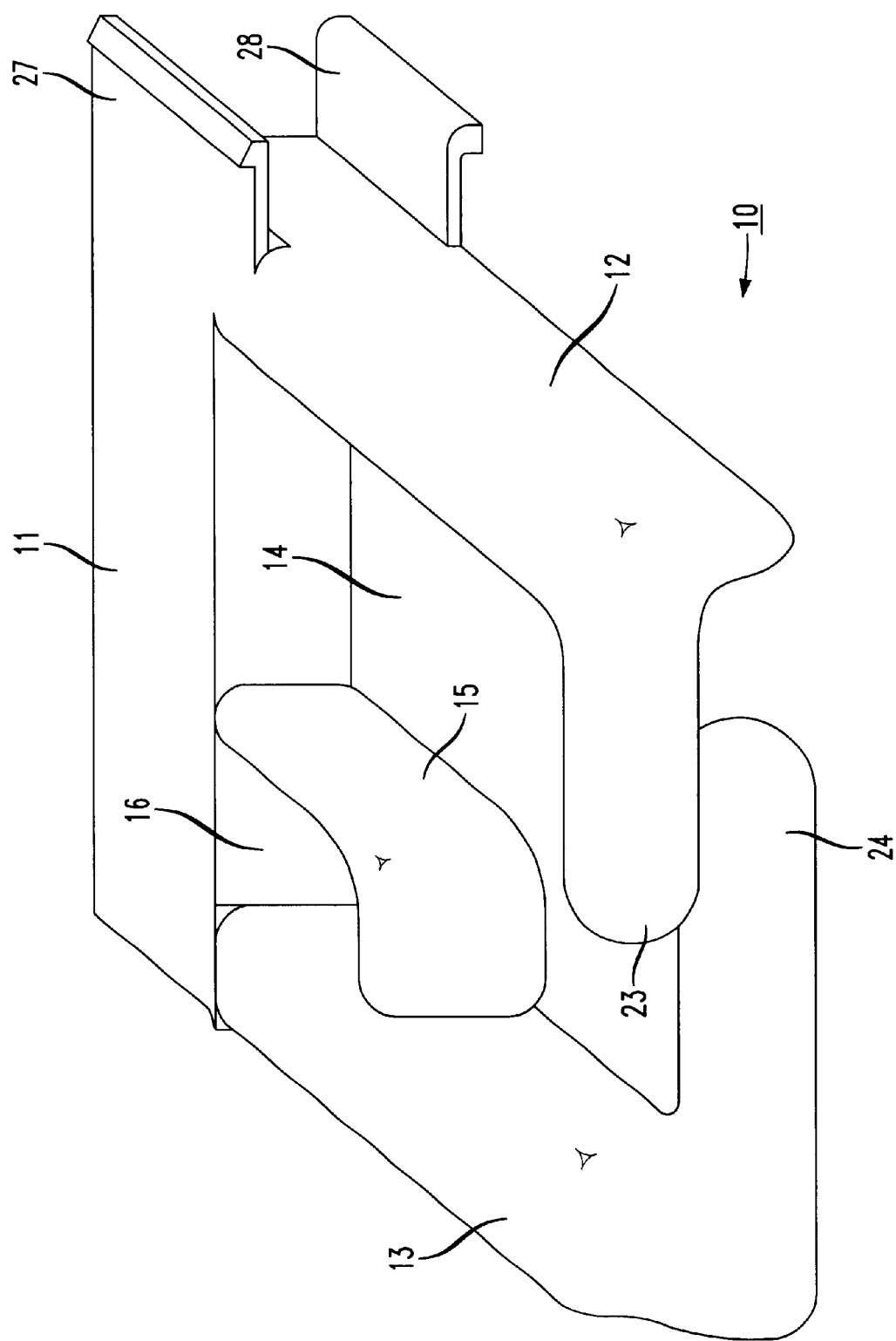
FIG. 3 is a perspective view of the present invention.

FIG. 3 shows a perspective view of trough 10, a better illustration of the features of the present invention.

FIG. 4 shows pivotable arm 13 in an open position. For larger wires and cables whose diameters are wider than gaps 26 and 17, the opening of pivotable arm 13 provides access to space 14 and sub-space 16.

Figure 5:
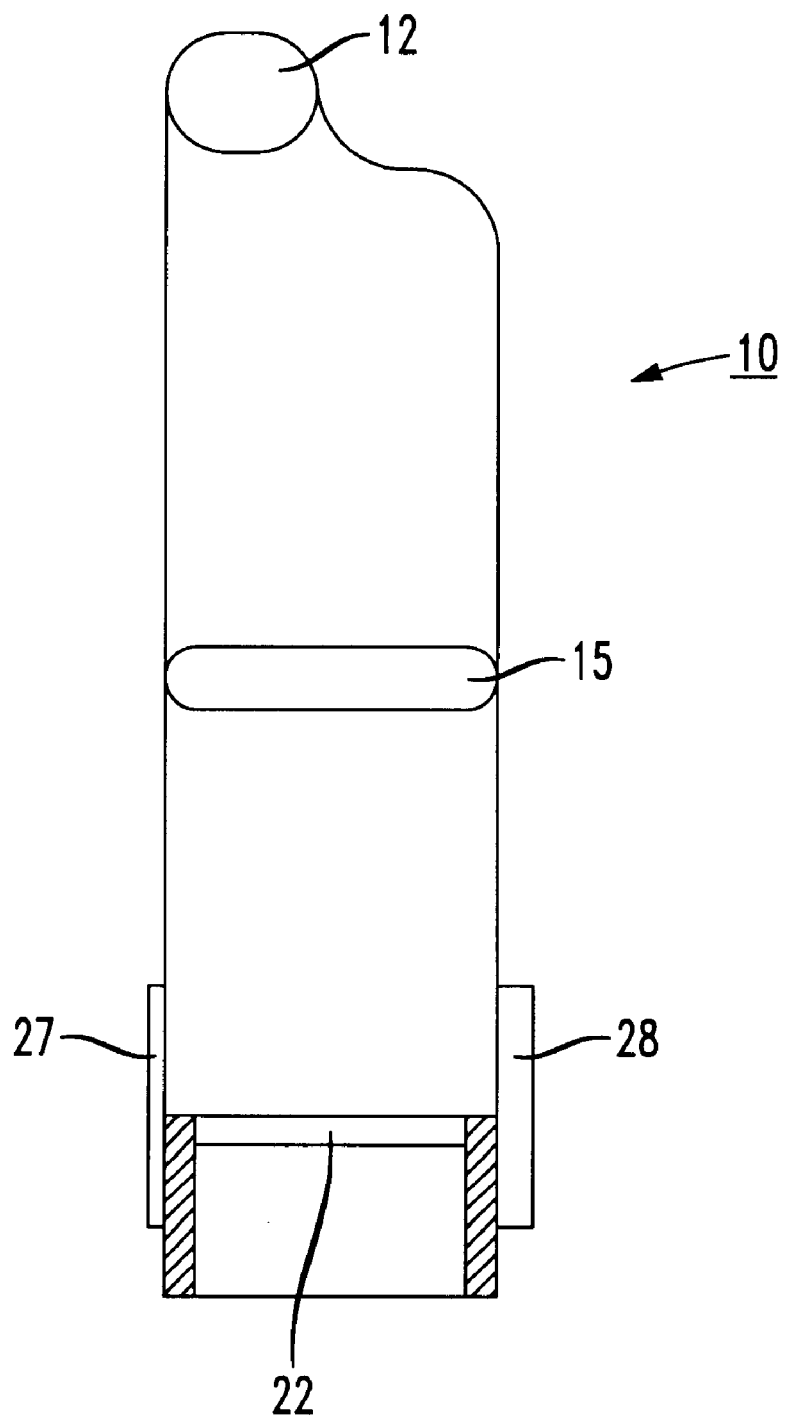
FIG. 5 is a cross sectional view of the present invention taken along line 5—5 in FIG. 4.

FIG. 5 is a cross-sectional view of trough 10 illustrating arm 12, retainer hook 15 and ledge 22 of base 11.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for separately retaining first and second types of wires and/or cables comprising:
   (a) a base defining a plane;
   (b) first and second arms extending from said base parallel to said plane of said base, enclosing a space therebetween for retaining said first type of wires and/or cables; and
   (c) a retainer hook extending from said base parallel to said plane of said base into said space, enclosing a sub-space within said space enclosed by said retainer hook, said base and said second arm, said second type of wires and/or cables being retained in said sub-space.

2. The device according to claim 1 wherein each of said arm having a tip, said first and second arms being offset such that said tip of said first arm are spaced from and overlaps said tip of said second arm defining a gap between said tips of said first and second arms for sliding said first type of wires and/or cables into said space.

3. The device according to claim 1 wherein said retainer hook having a tip, said retainer hook creating a gap between said tip of said retainer hook and said second arm for sliding said second type of wires an/or cables into said sub-space.

4. The device according to claim 1 wherein said second arm having a bottom portion, said second arm pivotable at said bottom portion from a closed position to an open position from said base to allow access to said space by said first type of wires and/or cables and to said sub-space by said second type of wires and/or cables.

5. The device according to claim 4 wherein said bottom portion of said second arm having a latch extending therefrom, said base having a ledge for engaging said latch to positively maintain said second arm in a closed position.

6. The device according to claim 1 wherein said first and second arms are L-shaped.

7. A device for separately retaining first and second types of telephone wires and/or cables entering and/or exiting a junction box, said junction box having mating cooperative units for mounting said device, comprising:
   (a) a base defining a plane and having a hook and latch extending therefrom for engaging respective mating units on said junction box;
   (b) first and second arms extending from said base parallel to said plane of said base, enclosing a space therebetween for retaining said first type of wires and/or cables; and
   (c) a retainer hook extending from said base parallel to said plane of said base into said space, enclosing a sub-space within said space enclosed by said retainer hook, said base and said second arm, said second type of wires and/or cables being retained in said sub-space.

* * * * *